(12) United States Patent
Yan et al.

(10) Patent No.: US 8,617,770 B2
(45) Date of Patent: Dec. 31, 2013

(54) ELECTRODES CONTAINING OXYGEN EVOLUTION REACTION CATALYSTS

(75) Inventors: Susan G. Yan, Fairport, NY (US);
Hubert A. Gasteiger, Leghorn (IT);
Paul Taichiang Yu, Pittsford, NY (US);
Wenbin Gu, Pittsford, NY (US);
Jingxin Zhang, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/203,559

(22) Filed: Sep. 3, 2008

(65) Prior Publication Data

US 2009/0068541 A1   Mar. 12, 2009

Related U.S. Application Data

(60) Provisional application No. 60/971,715, filed on Sep. 12, 2007.

(51) Int. Cl.
*H01M 8/10* (2006.01)
*H01M 4/86* (2006.01)
*H01M 4/88* (2006.01)

(52) U.S. Cl.
USPC .......... 429/524; 429/483; 429/484; 429/485; 429/488; 429/523; 429/535; 29/623.3

(58) Field of Classification Search
USPC ................ 429/480, 482, 492, 523, 524
See application file for complete search history.

(56) References Cited

U.S. PATENT DOCUMENTS

| 3,134,689 A | | 5/1964 | Pritikin et al. | |
| 4,028,274 A | * | 6/1977 | Kunz | 502/184 |
| 4,272,353 A | | 6/1981 | Lawrance et al. | |
| 6,855,453 B2 | | 2/2005 | Bett et al. | |
| 2002/0009626 A1 | | 1/2002 | Terazono et al. | |
| 2003/0068544 A1 | * | 4/2003 | Cisar et al. | 429/40 |
| 2004/0126644 A1 | * | 7/2004 | Bett et al. | 429/40 |
| 2004/0137311 A1 | * | 7/2004 | Mathias et al. | 429/44 |
| 2006/0183006 A1 | * | 8/2006 | Liu et al. | 429/13 |
| 2007/0298304 A1 | * | 12/2007 | Ohma et al. | 429/33 |

FOREIGN PATENT DOCUMENTS

| DE | 600 07 334 | 10/2004 |
| DE | 103 94 013 | 12/2005 |
| DE | 11 2004 000 288 | 9/2006 |

OTHER PUBLICATIONS

Ioroi et al., "IrO2-deposited Pt electrocatalysts for unitized regenerative polymer electrolyte fuel cells", Journal of Applied Electrochemistry, vol. 31, pp. 1179-1183.*

Yao et al., "Chemical deposition of platinum nanoparticles on iridium oxide for oxygen electrode of unitized regenerative fuel cell", Electrochemistry Communications, vol. 9, Issue 5, May 2007, pp. 1029-1034.*

Supramaniam Srinivasan, "Recent Advances in Solid Polymer Electrolyte Fuel Cell Technology with Low Platinum Loading Electrodes", Journal of Power Sources, (1990), 367-387, 29.

* cited by examiner

*Primary Examiner* — Patrick Ryan
*Assistant Examiner* — Ladan Mohaddes
(74) *Attorney, Agent, or Firm* — BrooksGroup

(57) ABSTRACT

One embodiment of the invention includes a method including providing a cathode catalyst ink comprising a first catalyst, an oxygen evolution reaction catalyst, and a solvent; and depositing the cathode catalyst ink on one of a polymer electrolyte membrane, a gas diffusion medium layer, or a decal backing.

16 Claims, 5 Drawing Sheets

START-STOP: 80C, 100kPa(abs), 80%RH

| | ELECTRODES | Ir MASS (mg$_{Ir}$/cm$^2$) | i$_{OER}$ (mA/cm$^2$) | i$_{COR}$ (mA/cm$^2$) | t$_{10\%C\text{-loss}}$ (SEC) | X vs Pt/C | X vs Pt/Gr-C |
|---|---|---|---|---|---|---|---|
| BASE | 0.05/0.4mgPt/cm$^2$ (50%Pt/C) | | 3.74 | 52.75 | 24.4 | 1.0 | 0.2 |
| | 0.05/0.4mgPt/cm$^2$ (50%Pt/Gr-C) | | 13.15 | 10.27 | 125.3 | 5.1 | 1.0 |
| IrOx | 0.05/0.4mgPt/cm$^2$ (50%Pt/C) + 2%wt IrOx IN CATHODE | 0.008 | 146.20 | 13.16 | 97.7 | (4.0) | 0.8 |
| | 0.05/0.4mgPt/cm$^2$ (50%Pt/Gr-C) + 2%wt IrOx IN CATHODE | 0.008 | 156.53 | 0.85 | 1522.4 | 62.4 | (12.2) |

ELECTRODES CONTAINING OXYGEN EVOLUTION REACTION CATALYSTS

This application claims the benefit of U.S. Provisional Application No. 60/971,715, filed Sep. 12, 2007.

TECHNICAL FIELD

The field to which the disclosure generally relates includes catalysts for polymer electrolyte membrane fuel cells that reduce corrosion on cathode catalyst layers.

BACKGROUND

Recently, polymer electrolyte membrane (PEM) fuel cells have generated significant interest for automotive applications. Automotive competitiveness requires a catalyst-related cell voltage loss less than about 50 mV over the entire current density range over an automotive lifetime greater than 10 years. This may include about 300,000 large load cycles and about 30,000 start/stop cycles. Such durability goals have been limited by cathode electrode degradation, in particular due to carbon corrosion. Factors that impact carbon corrosion include the many startup/shutdown cycles and localized $H_2$ starvation. Startup/shutdown associated carbon corrosion may be due to a local high potential between parts of the cathode and the adjacent electrolyte while an air/$H_2$ front is passing through the anode when the cathode is still filled with air. This local high potential drives rapid carbon corrosion.

A hydrogen fuel cell is an electro-chemical device that includes an anode and a cathode with an electrolyte therebetween. The anode receives hydrogen-rich gas or pure hydrogen and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work may be used to operate a vehicle, for example.

PEM fuel cells are popular for vehicle applications. The PEM fuel cell generally includes a solid-polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture, and the membrane defines a membrane electrode assembly (MEA). MEAs are relatively expensive to manufacture and require certain conditions for effective operation. These conditions include proper water management and humidification, and control of catalyst poisoning constituents, such as carbon monoxide (CO).

Several fuel cells are typically combined in a fuel cell stack to generate the desired power. The fuel cell stack includes a series of flow field or bipolar plates positioned between the several MEAs in the stack. The bipolar plates include an anode side and a cathode side for adjacent fuel cells in the stack. The fuel cell stack receives an anode hydrogen reactant gas that flows into the anode side of the stack. Anode gas flow channels are provided on the anode side of the bipolar plates that allow the anode gas to flow to the anode side of the MEA. The fuel cell stack receives a cathode reactant gas, typically a flow of air forced through the stack by a compressor. Cathode gas flow channels are provided on the cathode side of the bipolar plates that allow the cathode gas to flow to the cathode side of the MEA. Not all of the oxygen is consumed by the stack and some of the air is output as a cathode exhaust gas that may include liquid water as a stack by-product. The bipolar plates may also include flow channels for a cooling fluid. An automotive fuel cell stack, for example, may include about two hundred or more bipolar plates.

The bipolar plates are typically made of a conductive material, such as stainless steel, titanium, aluminum, polymeric carbon composites, or graphite etc., so that they conduct the electricity generated by the fuel cells from one cell to the next cell and out of the stack. Metal bipolar plates typically produce a natural oxide on their outer surface that makes them resistant to corrosion. However, this oxide layer is not conductive, and thus increases the internal resistance of the fuel cell, reducing its electrical performance. Also, the oxide layer may frequently make the plates more hydrophobic.

SUMMARY OF EXEMPLARY EMBODIMENTS OF THE INVENTION

One embodiment of the invention includes a method including providing a cathode catalyst ink comprising a first catalyst, an oxygen evolution reaction catalyst, and a solvent; and depositing the cathode catalyst ink on one of a polymer electrolyte membrane, a gas diffusion medium layer, or a decal backing.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
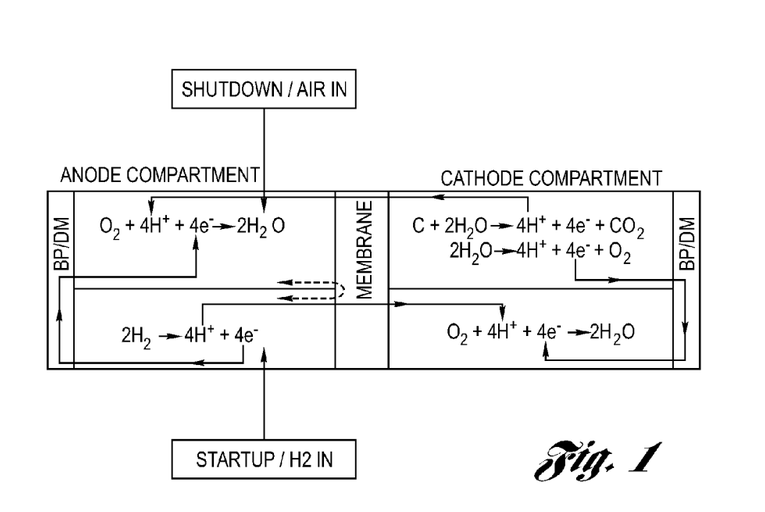
FIG. 1 shows reactions that occur during startup and shutdown of the fuel cell.

Referring to FIG. 1, reactions that occur during startup and shutdown of the fuel cell in both the anode compartment and the cathode compartment are shown. Carbon corrosion may occur in the fuel during startup and shutdown operations.

In one embodiment, the cathode may include an oxygen evolution reaction (OER) catalyst and an oxygen reduction reaction (ORR) catalyst. Each of the OER catalyst and the ORR catalyst may be supported on carbon, for example graphitized carbon. In one embodiment, the ORR catalyst may be Pt, and the ORR catalyst loading may be 50% or higher, where the loading is the weight percentage of Pt with respect to the total mass of Pt and carbon support material. In one embodiment, start/stop related degradation may be reduced by the incorporation of the OER catalyst into the cathode that is more active than the ORR catalyst, where the ORR catalyst may be Pt. In one embodiment, the start/stop related degradation may include carbon corrosion caused by startup/shutdown of the fuel cell and/or Global/local hydrogen starvation. In one embodiment, the OER catalyst may improve startup/shutdown durability without compromising fuel cell performance.

The addition of OER catalyst in the cathode may enhance the activity of oxygen evolution reaction in the cathode. During fuel cell system start/stop, the $H_2$/air front is generated in the anode as the $H_2$ or air is flushed into the anode when the cathode is filled with air. The $H_2$/air front in the anode results in the generation of the currents of hydrogen oxidation reaction (HOR) and oxygen reduction reaction (ORR) in different sections of the anode electrode. This ORR in the anode induces carbon corrosion reaction current in the cathode, which is to the right of ORR in the anode shown in FIG. 1. The current of HOR or ORR in the anode is equally balanced with the summation of the current of COR and OER in the cathode area, which is right opposite side of ORR in the anode. According to the charge conservation, the more OER current, the less the COR current. Therefore, the addition of active OER catalyst improves start/stop durability.

Figure 2:
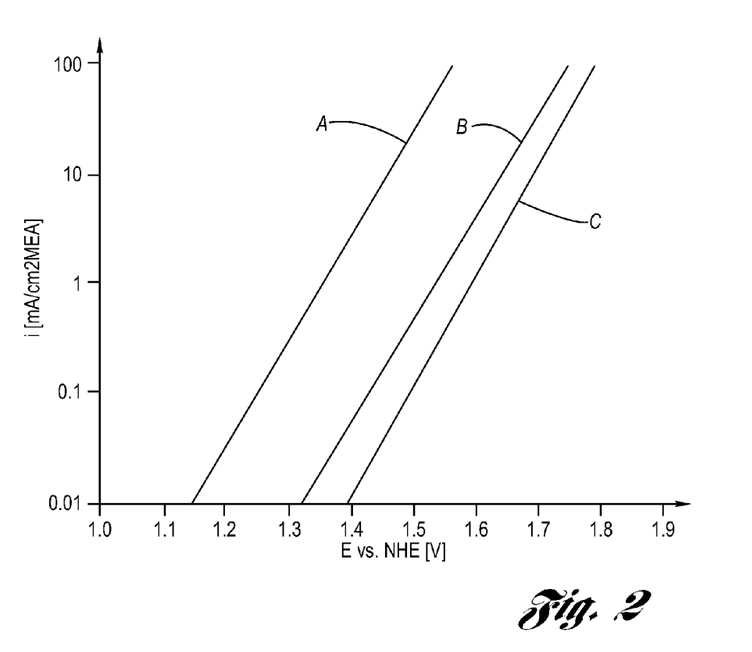
FIG. 2 shows cathode kinetics for carbon oxidation and oxygen evolution reactions.

FIG. 2 shows cathode kinetics for a fuel cell cathode at 80° C., 21 kPa $O_2$, 100 kPa $H_2$. As shown in FIG. 2, such a catalyst (OER catalyst) may allow the evolution of oxygen from electrolysis of water to occur at a lower potential than the OER on Pt. This results in an increase in current from OER and a reduction in current from carbon oxidation, thereby decreasing carbon corrosion. Referring to FIG. 2, line A is the carbon oxidation reaction (COR) with a platinum/carbon catalyst; line B is the carbon oxidation reaction (COR) with a platinum/graphitized carbon catalyst (Pt/Gr-C); and line C is the oxygen evolution reaction (OER) with a platinum/graphitized carbon catalyst (Pt/Gr-C). In one embodiment, the OER catalyst may have a higher activity than Pt at significantly lower loadings. In one embodiment, the carbon catalyst includes a conventional non-corrosion resistant carbon. In another embodiment, the graphitized carbon catalyst includes a corrosion resistant carbon.

In one embodiment, membrane electrode assemblies (MEAs) with electrodes comprised of an OER catalyst supported on a corrosion-resistant carbon mixed with either conventional PtNulcan or with Pt/corrosion-resistant carbon catalysts have been prepared and tested. In one embodiment, the OER catalyst may comprise an oxide of iridium or derivative thereof. In an embodiment the OER catalyst may comprise IrOx (iridium oxide), wherein x may range from 0 to 2. Start/stop degradation and relative carbon corrosion rates have been measured.

In one embodiment, a method of fabricating MEAs is provided including mixing an OER catalyst, for example IrOx, directly into a cathode catalyst ink. The cathode catalyst ink may include a first catalyst, an electrically conductive material, and a solvent. In one embodiment, the first catalyst may be an ORR catalyst. The ORR catalyst may be platinum. In various embodiments, the OER catalyst may be present in an amount ranging from about 0.1 wt % to about 10 wt % of the first catalyst. In one embodiment, the catalyst ink may include an ionomer and a carbon support. The carbon support may be, for example, graphitized carbon. The ratio of ionomer to carbon may be between 0.6 and 2.0. In another embodiment, the ratio of ionomer to carbon may be between 0.8 to 1.0.

The cathode catalyst ink may then be applied and the MEA prepared according to methods known in the art. The cathode catalyst ink may be deposited on a polymer electrolyte membrane, a gas diffusion media layer, or a decal backing.

In another embodiment, the OER catalyst may be deposited as a separate layer over the cathode. For example, in one embodiment the OER catalyst may be IrOx which may be formed as a separate layer on top of a Pt catalyst layer. The OER catalyst layer may be positioned between the electrode and the polymer electrolyte membrane (PEM).

Figure 3:
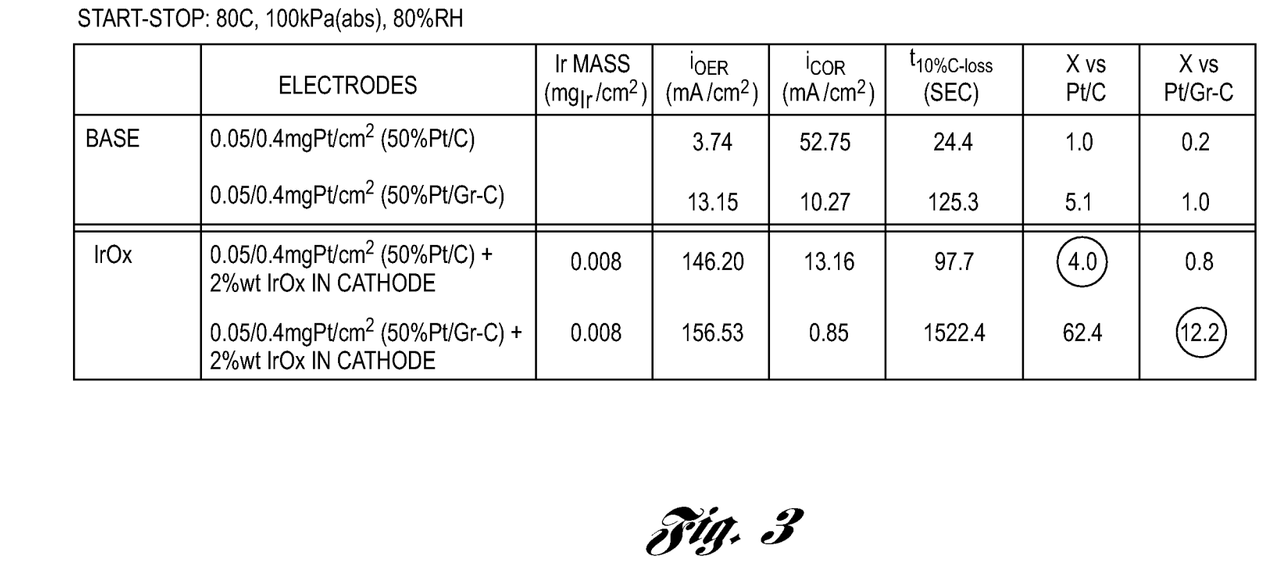
FIG. 3 shows model predictions of startup/shutdown degradation rates for an MEA according to one embodiment of the invention.

In one embodiment, IrOx loadings of 2 wt % of the Pt loading (or 1 wt % with respect to total catalyst and carbon weight) have been found to significantly reduce start/stop degradation rates without compromising fuel cell performance. FIG. 3 shows model predictions of startup/shutdown degradation rates for an MEA containing 2 wt % IrOx with respect to Pt loading using carbon oxidation reaction (COR) and oxygen evolution reaction (OER) kinetics. Based on the model predictions, the Pt/C (platinum/conventional carbon) +2% IrOx has an improvement of four times that of Pt/C with no IrOx, and the PtGr-C (platinum/graphitized carbon)+2% IrOx has an improvement of twelve times that of Pt/Gr-C with no IrOx.

Figure 4:
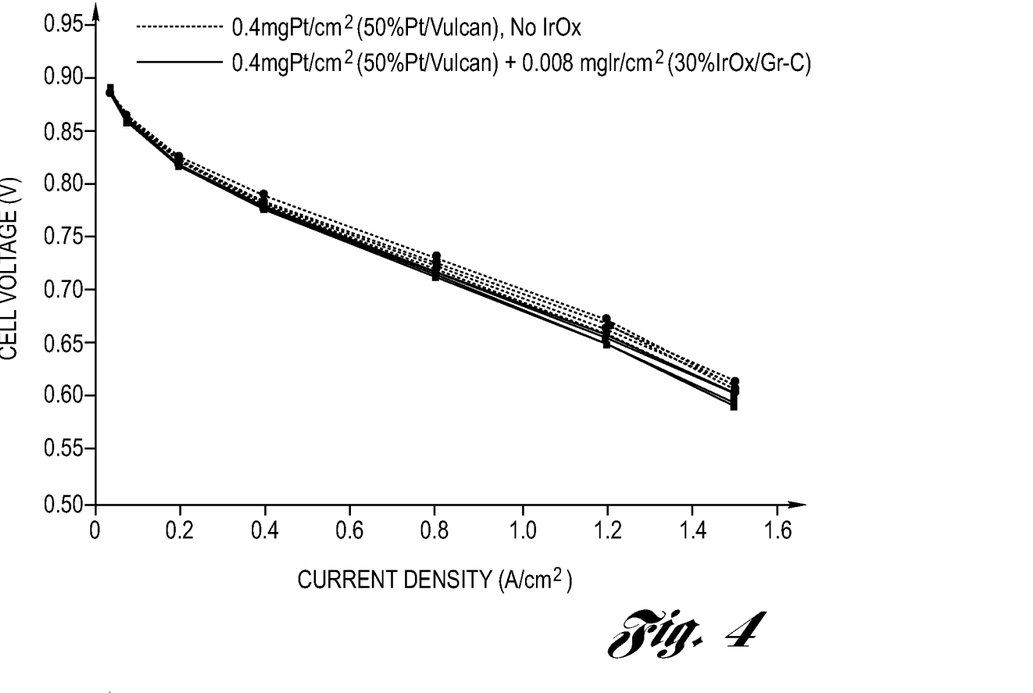
FIG. 4 shows polarization curves for beginning of life performance according to one embodiment of the invention.
Figure 5:
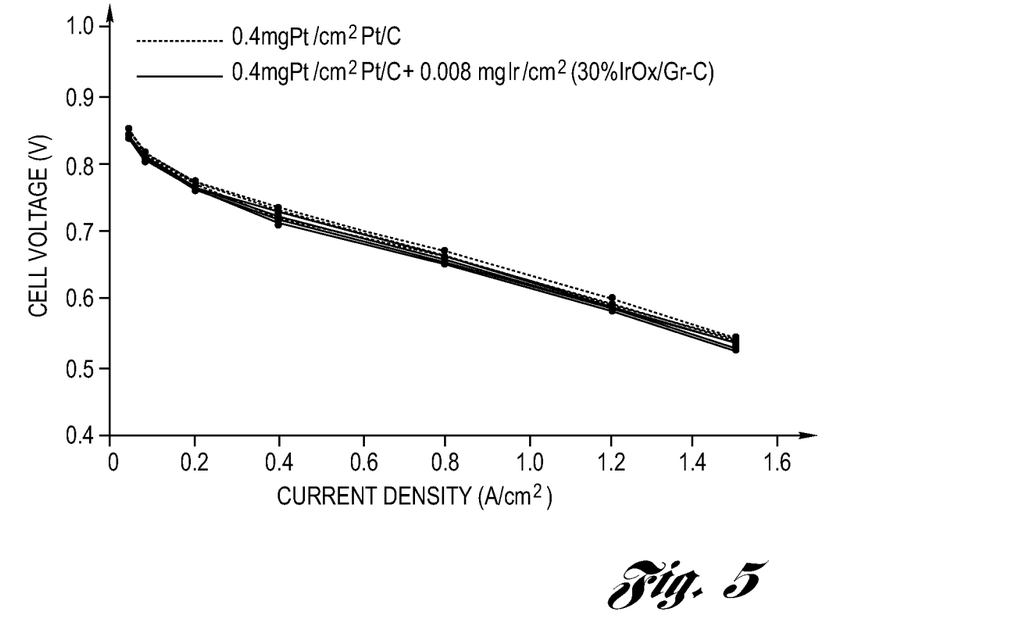
FIG. 5 shows polarization curves for beginning of life performance according to one embodiment of the invention.
Figure 6:
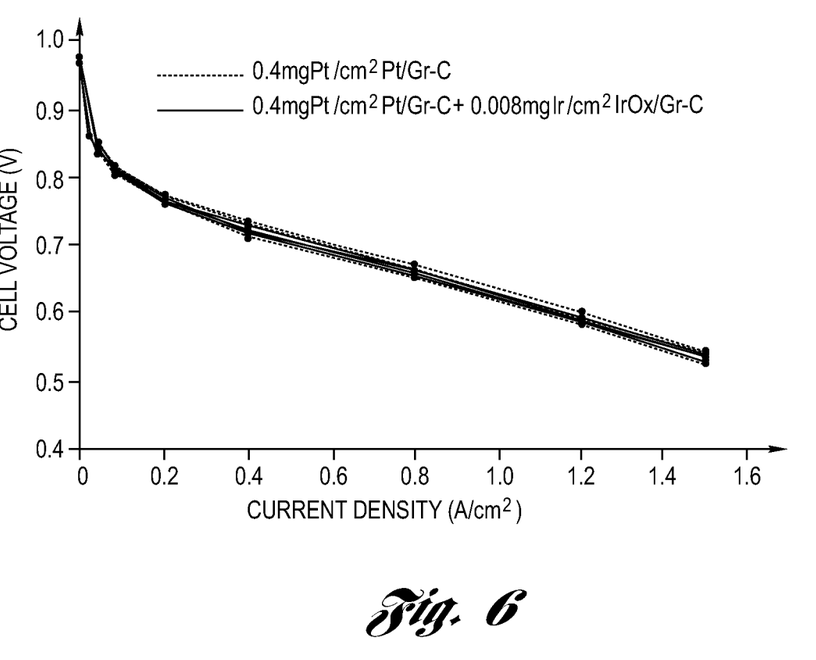
FIG. 6 shows polarization curves for beginning of life performance according to one embodiment of the invention.

FIG. 4 shows polarization curves for the beginning of life performance of MEAs made with Pt/Vulcan with and without added IrOx. The conditions of FIG. 4 are 60° C., 100% RH, 270 kPa, and 2/2 $H_2$/Air Stoic. FIG. 5 shows polarization curves for the beginning of life performance of MEAs made with Pt/C with and without added IrOx, wherein there was no significant loss in performance with the addition of 0.008 mgIr/cm$^2$ (2% IrOx). The conditions of FIG. 5 are 80° C., 32% RH, 150 kPa, and 1.5/2 $H_2$/Air Stoic. FIG. 6 shows polarization curves for beginning of life performance of MEAs made with Pt/Gr-C with and without added IrOx, wherein there was no significant loss in performance with the addition of 0.008 mgIr/cm$^2$ (2% IrOx). The conditions of FIG. 6 are 80° C., 32% RH, 150 kPa, and 1.5/2 $H_2$/Air Stoic.

In one embodiment, an accelerated corrosion test was performed for Pt/C with and without IrOx. The corrosion potential for Pt/C at 10 mA/cm$^2$ was about 150 mV higher than for Pt/C at 1 mA/cm$^2$. The Tafel slope was about 150 mV/dec. The corrosion potential for Pt/C+IrOx at 10 mA/cm$^2$ was about 80 mV higher than for Pt/C at 1 mA/cm$^2$. In one embodiment, the OER may carry 67% of the corrosion current and the C-corrosion 33%. The addition of 2 wt % IrOx/C to Pt/C resulted in a 3× improvement based on corrosion current and a 4× improvement based on time. In another embodiment, an accelerated corrosion test was performed for Pt/Gr-C with and without IrOx. The corrosion potential for Pt/Gr-C at 10 mA/cm$^2$ was about 150 mV higher than for Pt/Gr-C at 1 mA/cm$^2$. The Tafel slope was about 130 mV/dec. The corrosion potential for Pt/Gr-C+IrOx at 10 mA/cm$^2$ was approximately equivalent to the corrosion potential for Pt/Gr-C at 1 mA/cm$^2$. In one embodiment, the OER may carry 90% of the corrosion current and the C-corrosion 10%. The addition of 2 wt % IrOx/Gr-C to Pt/Gr-C resulted in a 10× improvement based on corrosion current and a 13× improvement based on time.

Figure 7:
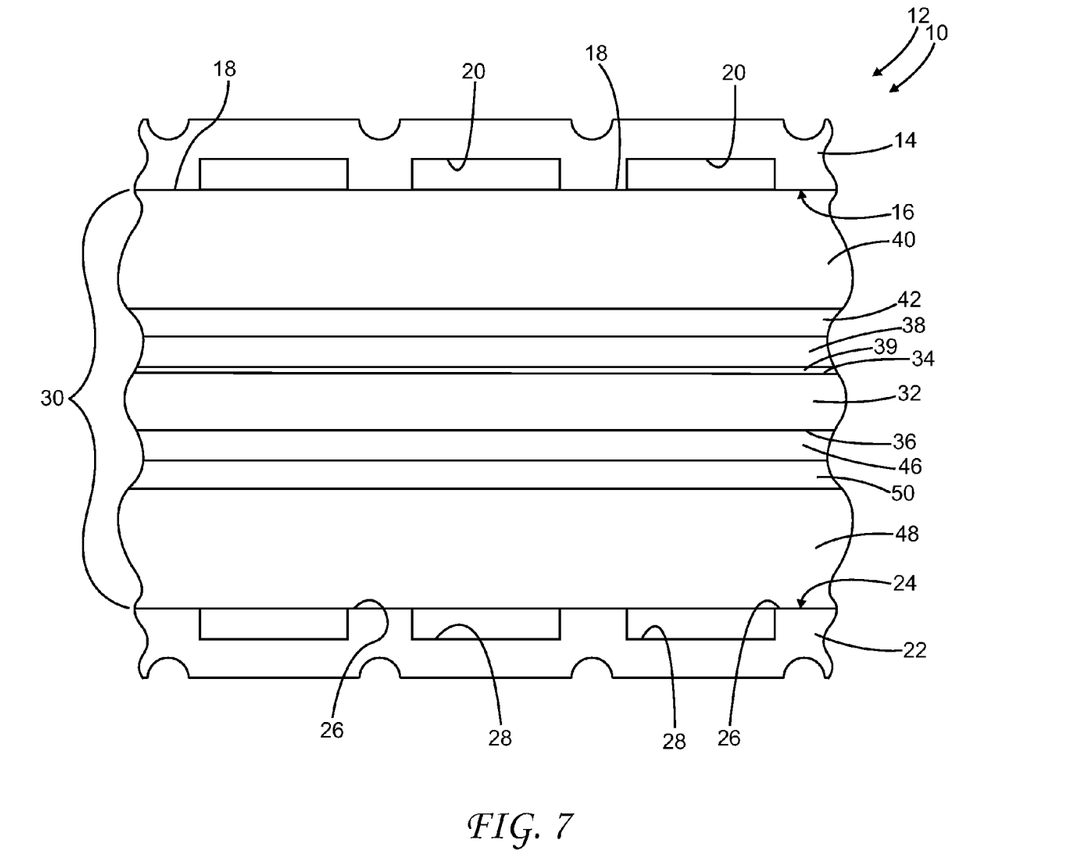
FIG. 7 illustrates a product according to one embodiment of the invention.

Referring to FIG. 7, one embodiment of the invention includes a product 10 comprising a fuel cell 12. The fuel cell 12 includes a first fuel cell bipolar plate 14 including a first face 16 having a reactant gas flow field defined therein by a plurality of lands 18 and channels 20. The reactant gas flow field may deliver a fuel on one side of the bipolar plate and an oxidant on the other side of the bipolar plate. The fuel cell 12 includes a second fuel cell bipolar plate 22 including a first face 24 having a reactant gas flow field defined therein by a plurality of lands 26 and channels 28. The lands 18 or 26 and channels 20 or 28 may be formed in the bipolar plate 14 or 22 by machining, etching, stamping, molding or the like. A soft goods portion 30 may be provided between the first fuel cell bipolar plate 14 and the second fuel cell bipolar plate 22. The first fuel cell bipolar plate 14 and the second fuel cell bipolar plate 22 may include a variety of materials including, but not limited to, a metal, metal alloy, and/or electrically conductive composite. In one embodiment, the first fuel cell bipolar plate 14 and the second fuel cell bipolar plate 22 may be stainless steel.

The soft goods portion 30 may include a polymer electrolyte membrane (PEM) 32 comprising a first face 34 and a second face 36. A cathode electrode 38 may overlie the first face 34 of the polymer electrolyte membrane 32. In one embodiment, the cathode electrode 38 may include an OER catalyst, as described above. For example, the OER catalyst IrOx may be mixed with Pt catalyst as a single cathode electrode 38 layer. In another embodiment, the OER catalyst may form a separate oxygen evolution catalyst layer 39 positioned between the cathode electrode 38 and the membrane 32. A first gas diffusion media layer 40 may overlie the cathode electrode 38, and optionally a first microporous layer 42 may be interposed between the first gas diffusion media layer 40 and the cathode electrode 38. The first gas diffusion media layer 40 may be hydrophobic. The first fuel cell bipolar plate 14 may overlie the first gas diffusion media layer 40.

An anode electrode 46 may underlie the second face 36 of the polymer electrolyte membrane 32. A second gas diffusion media layer 48 may underlie the anode layer 46, and optionally a second microporous layer 50 may be interposed between the second gas diffusion media layer 48 and the anode electrode 46. The second gas diffusion media layer 48 may be hydrophobic. The second fuel cell bipolar plate 22 may overlie the second gas diffusion media layer 48.

In various embodiments, the polymer electrolyte membrane 32 may comprise a variety of different types of membranes. The polymer electrolyte membrane 32 useful in various embodiments of the invention may be an ion-conductive material. Examples of suitable membranes are disclosed in U.S. Pat. Nos. 4,272,353 and 3,134,689, and in the Journal of Power Sources, Volume 28 (1990), pages 367-387. Such membranes are also known as ion exchange resin membranes. The resins include ionic groups in their polymeric structure; one ionic component for which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cationic exchange, proton conductive resins is the so-called sulfonic acid cationic exchange resin. In the sulfonic acid membranes, the cationic exchange groups are sulfonic acid groups which are attached to the polymer backbone.

The formation of these ion exchange resins into membranes or chutes is well-known to those skilled in the art. The preferred type is perfluorinated sulfonic acid polymer electrolyte in which the entire membrane structure has ionic exchange characteristics. These membranes are commercially available, and a typical example of a commercial sulfonic perfluorocarbon proton conductive membrane is sold by E. I. DuPont D Nemours & Company under the trade designation NAFION. Other such membranes are available from Asahi Glass and Asahi Chemical Company. The use of other types of membranes, such as, but not limited to, perfluorinated cation-exchange membranes, hydrocarbon based cation-exchange membranes as well as anion-exchange membranes are also within the scope of the invention.

In one embodiment, the first gas diffusion media layer 40 or the second gas diffusion media layer 48 may include any electrically conductive porous material. In various embodiments, the gas diffusion media layer may include non-woven carbon fiber paper or woven carbon cloth which may be treated with a hydrophobic material, such as, but not limited to, polymers of polyvinylidene fluoride (PVDF), fluroethylene propylene, or polytetrafluoroethylene (PTFE). The gas diffusion media layer may have an average pore size ranging from 5-40 micrometers. The gas diffusion media layer may have a thickness ranging from about 100 to about 500 micrometers.

In one embodiment, the electrodes (cathode layer 38 and anode layer 46) may be catalyst layers which may include catalyst particles such as platinum, and an ion conductive material such as a proton conducting ionomer, intermingled with the particles. The proton conductive material may be an ionomer such as a perfluorinated sulfonic acid polymer. The catalyst materials may include metals such as platinum, palladium, molybdenum, cobalt, ruthenium, nickel, or tin, or mixtures of metals such as platinum and molybdenum, platinum and cobalt, platinum and ruthenium, platinum and nickel, platinum and tin, other platinum transition-metal alloys, and other fuel cell electrocatalysts known in the art. The catalyst materials may be finely divided if desired. The catalyst materials may be unsupported or supported on a variety of materials such as but not limited to finely divided carbon particles. In one embodiment, the cathode electrode 38 may be formed from a cathode catalyst ink including a first catalyst, an oxygen evolution reaction catalyst, and a solvent. The cathode electrode 38 may also include an electrically conductive material for supporting the catalyst such as carbon or other conductive materials in the form of particles having solid or hollow cores.

In one embodiment, the first microporous layer 42 or the second microporous layer 50 may be made from materials such as carbon blacks and hydrophobic constituents such as polytetrafluoroethylene (PTFE) and polyvinylidene fluoride (PVDF), and may have a thickness ranging from about 2 to about 100 micrometers. In one embodiment the microporous layer may include a plurality of particles, for example including graphitized carbon, and a binder. In one embodiment the binder may include a hydrophobic polymer such as, but not limited to, polyvinylidene fluoride (PVDF), fluoroethylene propylene (FEP), polytetrafluoroethylene (PTFE), or other organic or inorganic hydrophobic materials. The particles and binder may be included in a liquid phase which may be, for example, a mixture of an organic solvent and water to provide dispersion. In various embodiments, the solvent may include at least one of 2-propanol, 1-propanol or ethanol, etc. The dispersion may be applied to a fuel cell substrate, such as, a gas diffusion media layer or a hydrophobic coating over the gas diffusion media layer. In another embodiment, the dispersion may be applied to an electrode. The dispersion may be dried (by evaporating the solvent) and the resulting dried microporous layer may include 60-90 weight percent particles and 10-40 weight percent binder. In various other embodiments, the binder may range from 10-30 weight percent of the dried microporous layer.

When the terms "over", "overlying", "overlies", or "under", "underlying", "underlies" are used with respect to the relative position of a first component or layer with respect to a second component or layer, such shall mean that the first component or layer is in direct contact with the second component or layer, or that additional layers or components are interposed between the first component or layer and the second component or layer.

The above description of embodiments of the invention is merely exemplary in nature and, thus, variations thereof are not to be regarded as a departure from the spirit and scope of the invention.

What is claimed is:

1. A method comprising:
providing a polymer electrolyte membrane comprising a first face and a second face;
providing a cathode electrode over the first face of the polymer electrolyte membrane, wherein the cathode electrode comprises an oxygen reduction reaction first catalyst supported on graphitized carbon and an Iridium oxide oxygen evolution reaction catalyst having the formula $IrO_x$ supported on graphitized carbon, where x has a numeric value between 0 (not including 0) and 2, and wherein the oxygen evolution catalyst is present in an amount ranging from about 0.1 wt % to 2 wt % of the oxygen reduction reaction first catalyst, and wherein the oxygen reduction reaction first catalyst and the oxygen evolution reaction catalyst of the cathode electrode are in the form of finely divided particles and the cathode electrode further comprises a proton conducting ionomer intermingled with at least the oxygen reduction reaction first catalyst particles, and wherein the ratio of the ionomer to graphitized carbon is between 0.6 and 2.0;
providing a first microporous layer over the cathode electrode;
providing first gas diffusion media layer over the first microporous layer;
providing an anode electrode over the second face of the polymer electrolyte;
providing a second microporous layer over the anode electrode; and
providing a second gas diffusion media layer over the second microporous layer.

2. A method as set forth in claim 1 wherein the oxygen reduction reaction first catalyst comprises platinum.

3. A method as set forth in claim 2 wherein the platinum is 50% by weight with respect to the platinum and graphitized carbon.

4. A method as set forth in claim 1 further comprising:
providing a first fuel cell bipolar plate over the first gas diffusion media layer, wherein the first fuel cell bipolar plate comprises a first face and a reactant gas flow field defined in the first face, the reactant gas flow field comprising a plurality of lands and channels; and
providing a second fuel cell bipolar plate over the second gas diffusion media layer, wherein the second fuel cell bipolar plate comprises a first face and a reactant gas flow field defined in the first face, the reactant gas flow field comprising a plurality of lands and channels.

5. A method comprising:
providing a polymer electrolyte membrane comprising a first face and a second face;
providing an Iridium oxide oxygen evolution reaction catalyst having the formula IrOx supported on graphitized carbon over the first face of the polymer electrolyte membrane; wherein x has a numeric value between 0 (not including 0) and 2, and
providing a cathode electrode comprising a first catalyst supported on graphitized carbon over the oxygen evolution reaction catalyst, wherein the oxygen evolution reaction catalyst is present in an amount ranging from about 0.1 wt % to 2 wt % of the first catalyst, wherein the first catalyst and the oxygen evolution reaction catalyst of the cathode electrode are in the form of finely divided particles and the cathode electrode further comprises a proton conducting ionomer intermingled with at least the first catalyst particles, and wherein the ratio of the ionomer to graphitized carbon is between 0.6 and 2.0.

6. A method as set forth in claim 5 wherein the first catalyst comprises platinum.

7. A method as set forth in claim 5 wherein the platinum is 50% by weight with respect to the platinum and graphitized carbon.

8. A method as set forth in claim 5 further comprising:
providing a first gas diffusion media layer over the cathode electrode;
providing an anode electrode over the second face of the polymer electrolyte; and
providing a second gas diffusion media layer over the anode electrode.

9. A method as set forth in claim 8 further comprising:
providing a first fuel cell bipolar plate over the first gas diffusion media layer, wherein the first fuel cell bipolar plate comprises a first face and a reactant gas flow field defined in the first face, the reactant gas flow field comprising a plurality of lands and channels; and
providing a second fuel cell bipolar plate over the second gas diffusion media layer, wherein the second fuel cell bipolar plate comprises a first face and a reactant gas flow field defined in the first face, the reactant gas flow field comprising a plurality of lands and channels.

10. A method as set forth in claim 1 wherein the value of "X" in the formula $IrO_x$ is 1 or 2, and the iridium oxide oxygen evolution reaction catalyst is present in an amount ranging from about 0.1 wt % to about 2 wt % of the oxygen reduction reaction first catalyst.

11. A method as set forth in claim 1 wherein the first and second microporous layers consist of particles of graphitized carbon and a binder.

12. A method as set forth in claim 11 wherein the binder of the first and second microporous layers is a hydrophobic polymer of polyvinylidene fluoride or fluoroethylene propylene.

13. A method as set forth in claim 1 wherein the first and second microporous layers comprise about 60-90 wt % particles and about 10-40 wt % binder.

14. A method as set forth in claim 11 wherein the proton conducting Ionomer is a perfluorinated sulfonic acid polymer, and the oxygen evolution reaction catalyst is applied as a separate layer disposed over the oxygen reduction reaction first catalyst.

15. A method comprising: providing a polymer electrolyte membrane comprising a first face and a second face; providing an Iridium oxide oxygen evolution reaction catalyst having the formula IrOx supported on graphitized carbon over the first face of the polymer electrolyte membrane; wherein x has a numeric value between 0 (not including 0) and 2, and providing a cathode electrode comprising a first catalyst over the oxygen evolution reaction catalyst, wherein the oxygen evolution reaction catalyst is present in an amount ranging from about 0.1 wt % to 2 wt % of the first catalyst, wherein the first catalyst and the oxygen evolution reaction catalyst of the cathode electrode are in the form of finely divided particles and the cathode electrode further comprises a proton conducting ionomer intermingled with at least the first catalyst particles, and wherein the ratio of the ionomer to graphitized carbon is between 0.6 and 2.0, and wherein the cathode electrode further comprises an electrically conductive material for supporting the first catalyst in the form of particles having solid or hollow cores.

16. A method comprising:
   providing a polymer electrolyte membrane comprising a first face and a second face;
   providing a cathode electrode over the first face of the polymer electrolyte membrane, wherein the cathode electrode comprises an oxygen reduction reaction first catalyst and an Iridium oxide oxygen evolution reaction catalyst having the formula $IrO_x$ supported on graphitized carbon, where x has a numeric value between 0 (not including 0) and 2, and wherein the oxygen evolution catalyst is present in an amount ranging from about 0.1 wt % to 2 wt % of the oxygen reduction reaction first catalyst, and wherein the oxygen reduction reaction first catalyst and the oxygen evolution reaction catalyst of the cathode electrode are in the form of finely divided particles and the cathode electrode further comprises a proton conducting ionorner intermingled with at least the oxygen reduction reaction first catalyst particles, and wherein the ratio of the ionomer to graphitized carbon is between 0.6 and 2.0, and wherein the cathode electrode further comprises an electrically conductive material for supporting the oxygen reduction reaction first catalyst in the form of particles having solid or hollow cores;
   providing a first microporous layer over the cathode electrode;
   providing a first gas diffusion media layer over the first microporous layer;
   providing an anode electrode over the second face of the polymer electrolyte;
   providing a second microporous layer over the anode electrode; and
   providing a second gas diffusion media layer over the second microporous layer.

\* \* \* \* \*